(12) United States Patent
Hsuan et al.

(10) Patent No.: US 8,532,297 B2
(45) Date of Patent: Sep. 10, 2013

(54) TECHNIQUES FOR TRANSMITTING CONTROL CHANNEL INFORMATION

(75) Inventors: Yi Hsuan, Sunnyvale, CA (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/053,549

(22) Filed: Mar. 22, 2011

(65) Prior Publication Data

US 2012/0057703 A1 Mar. 8, 2012

Related U.S. Application Data

(60) Provisional application No. 61/381,005, filed on Sep. 8, 2010.

(51) Int. Cl.
*H04L 9/00* (2006.01)
*H04L 9/18* (2006.01)
*H04B 7/216* (2006.01)
*H04W 4/00* (2009.01)
*H04W 40/00* (2009.01)
*H04M 1/66* (2006.01)
*H04W 72/00* (2009.01)
*H04W 72/04* (2009.01)
*H04W 12/08* (2009.01)

(52) U.S. Cl.
USPC ........... 380/268; 370/328; 370/331; 370/342; 455/411; 455/452.1; 714/807

(58) Field of Classification Search
USPC ................ 380/268; 370/342, 328; 455/411, 455/452.1
See application file for complete search history.

(56) References Cited

U.S. PATENT DOCUMENTS

| | | | |
|---|---|---|---|
| 2003/0135736 A1 | 7/2003 | Pelly et al. | |
| 2006/0126833 A1 | 6/2006 | O'Leary et al. | |
| 2007/0097942 A1* | 5/2007 | Gorokhov et al. | 370/342 |
| 2009/0181691 A1* | 7/2009 | Kotecha et al. | 455/452.1 |
| 2009/0245516 A1 | 10/2009 | Ravikiran | |
| 2010/0203866 A1* | 8/2010 | Li et al. | 455/411 |
| 2011/0158168 A1* | 6/2011 | Chen et al. | 370/328 |
| 2012/0066572 A1* | 3/2012 | Lim et al. | 714/807 |

FOREIGN PATENT DOCUMENTS

| | | |
|---|---|---|
| KR | 10-2001-0064800 A | 7/2001 |
| KR | 10-2003-0078453 A | 10/2003 |
| WO | WO 2012023819 A2 * | 2/2012 |
| WO | 2012/033663 A1 | 3/2012 |

OTHER PUBLICATIONS

Deuk-Su Lyu ; Nam-Jin Park; "Architecture of base station transceiver for assessing wide band CDMA-based common air interface"; Satellite Communications, 1996. Proceedings of ICSC '96. The 2nd International Conference on vol. 3 Digital Object Identifier: 10.1109/ICSC.1996.865376; Publication Year: Jan. 1996 , pp. 182-186.*

(Continued)

*Primary Examiner* — Andrew L Nalven
*Assistant Examiner* — Courtney Fields
(74) *Attorney, Agent, or Firm* — Cool Patent, P.C.

(57) ABSTRACT

Techniques for protecting information elements transmitted to mobile stations from intruders. The technique can involve applying a randomized mask over an information element and then providing a scrambled cyclic redundancy check (CRC) value. A seed for the randomized mask can be different from a seed for the scrambled CRC value.

14 Claims, 2 Drawing Sheets

(56) References Cited

OTHER PUBLICATIONS

"Section 16.3.5.3.2.4 Assignment A-MAP", Part 16: Air Interface for Broadband Wireless Access Systems, IEEE P802.16m/D8, Aug. 25, 2010, pp. 579-580.

"Section 16.3.5.5.2.4 Assignment A-MAP IE", Part 16: Air Interface for Broadband Wireless Access Systems, IEEE P802.16m/D8, Aug. 25, 2010, pp. 598-600.

"Section 16.3.10.1.1 Burst CRC encoding", Part 16: Air Interface for Broadband Wireless Access Systems, IEEE P802.16m/D8, Aug. 25, 2010, pp. 813.

"Section 16.3.10.1.3 Randomization",Part 16: Air Interface for Broadband Wireless Access Systems, IEEE P802.16m/ D8, Aug. 25, 2010, pp. 816-817.

U.S. Appl. No. 12/889,949, filed Sep. 24, 2010, 37 pages.

"Section 5.3.3.1 DCI formats", 3rd Generation Partnership Project; Technical Specification Group Radio Access Network; Evolved Universal Terrestrial Radio Access (E-UTRA); Multiplexing and channel coding, Release 9, 3GPP TS 36.212 V9.2.0 (Jul. 2010), pp. 43.

"Section 5.3.3.2 CRC attachment", 3rd Generation Partnership Project; Technical Specification Group Radio Access Network; Evolved Universal Terrestrial Radio Access (E-UTRA); Multiplexing and channel coding, Release 9, 3GPP TS 36.212 V9.2.0 (Jun. 2010), pp. 57.

International Search Report and Written Opinion for PCT Patent Application No. PCT/US2011/049514, mailed on Feb. 9, 2012, 9 pages.

* cited by examiner

US 8,532,297 B2

TECHNIQUES FOR TRANSMITTING CONTROL CHANNEL INFORMATION

RELATED ART

This application is related to U.S. Patent Application Ser. No. 61/381,005, filed Sep. 8, 2010 and claims priority therefrom. This application is also related to U.S. patent application Ser. No. 12/889,949, filed Sep. 24, 2010.

FIELD

The subject matter disclosed herein relates generally to techniques for masking control channel messages transmitted using a wireless network.

RELATED ART

In wireless communications systems such as 3rd Generation Partnership Project (3GPP) Long Term Evolution (LTE) or IEEE 802.16, downlink user specific control channel (US-CCH) are used to transmit user-specific and non-user-specific control information to a user element. In IEEE 802.16m, the user specific control channel is referred to as Advanced Media Access Protocol (A-MAP). Unicast control channels of many advanced cellular systems do not provide strong security protection. For example, each unicast control channel of IEEE 802.16m and LTE has its cyclic redundancy check (CRC) value masked by a user specific identifier (ID). See, for example, section 16.3.5.3.2.4 of IEEE 802.16m draft 8 (2010) and section 5.3.3.2 of 3GPP TS 36.212 (2010). A particular mobile station can use its user specific ID to descramble the CRC value and then perform a CRC test. If the CRC test passes, the mobile station can access that control channel information.

However, content of the control channel is either completely un-protected (e.g., LTE) or scrambled with a random sequence whose seed is the user ID that is also used to descramble the CRC value (e.g., IEEE 802.16m draft 8). Scrambling using a random sequence with the user ID as the seed may not provide adequate protection because an intruder also has to determine the user ID for a CRC test. An intruder can guess a user specific ID to descramble the CRC value and perform a CRC test using the descrambled CRC value. If the CRC test passes, the correct user ID is found and that user ID can be used to descramble content of the control channel. Accordingly, after acquiring the user ID, the content is completely unprotected to the intruder. Unprotected control information creates privacy and potential security issues, because an intruder can potentially utilize the control information to access the data channel. It is desirable to provide manners to protect content of the unicast control channel from access by unintended recipients so that the data privacy and security are improved.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
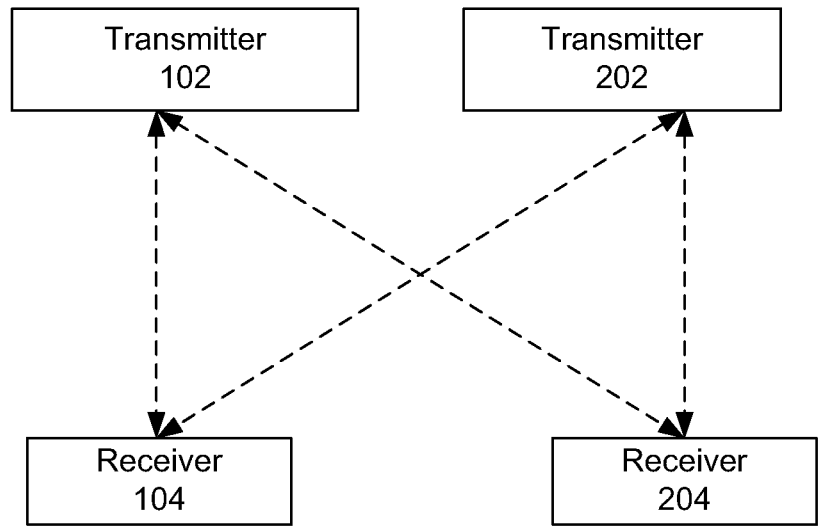
FIG. 1 depicts an example of devices connected using a wireless network.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments provide a multiple-stage protection scheme for protecting unicast control information prior to transmission to user elements (UE) or mobile stations. A first stage of protection includes scrambling the entire Information Element (IE) with a random sequence whose seed is a number different from the user ID of the UE or mobile station that is to receive unicast control information. For example, unicast control IE are described in Table 845 of section 16.3.5.5.2.4 of IEEE 802.16m draft 8 (2010). For 3GPP LTE, instead of scrambling IE, downlink control information (DCI) formats can be scrambled. DCI formats are described in section 5.3.3.1 of 3GPP TS 36.212 (2010). A second stage of protection can include applying existing CRC masking using the user ID of the UE or mobile station that is to access the IE. The UE or mobile station can descramble the CRC value using its user ID. For an IEEE 802.16 compatible network, a user ID can be a 16 bit station identifier (STID) and for a 3GPP LTE compatible network, the user ID can be a 16 bit Radio Network Temporary Identifier (RNTI).

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, mobile phone, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, 3GPP standards, physical layer description of 3GPP LTE advanced 36211 release 10, and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

FIG. 1 depicts an example of devices connected using a wireless network. The network can be compliant with any variety of IEEE 802.16 or 3GPP LTE as well as variations and revisions thereof. In the downstream or downlink case, the generically-named transmitters 102 and/or 202 above may be interchangeably referred to as a base station (BS), Node B (NB), enhanced Node B (eNB), or access point (AP). In various embodiments, for the downlink, the transmitter can also be interchangeably referred to as network entities such as a Mobile Switching Center (MSC), Serving GPRS Support Node (SGSN), or Mobility Management Entity (MME). In this downlink case, the receivers 104 and/or 204 above may be interchangeably referred to as a mobile station (MS), subscriber station (SS), user equipment (UE), station (STA), machine-type communication (MTC) device, or machine-to-machine (M2M) device at the system level herein. Further, the terms BS, NB, eNB, AP, MSC, SGSN, and MME may be conceptually interchanged, depending on which wireless protocol is being used, so a reference to BS herein may also be seen as a reference to any of NB, eNB, AP, MSC, SGSN, and MME. Similarly, a reference to MS or SS herein may also be seen as a reference to any of UE, STA, an MTC device, or M2M device.

Figure 2:
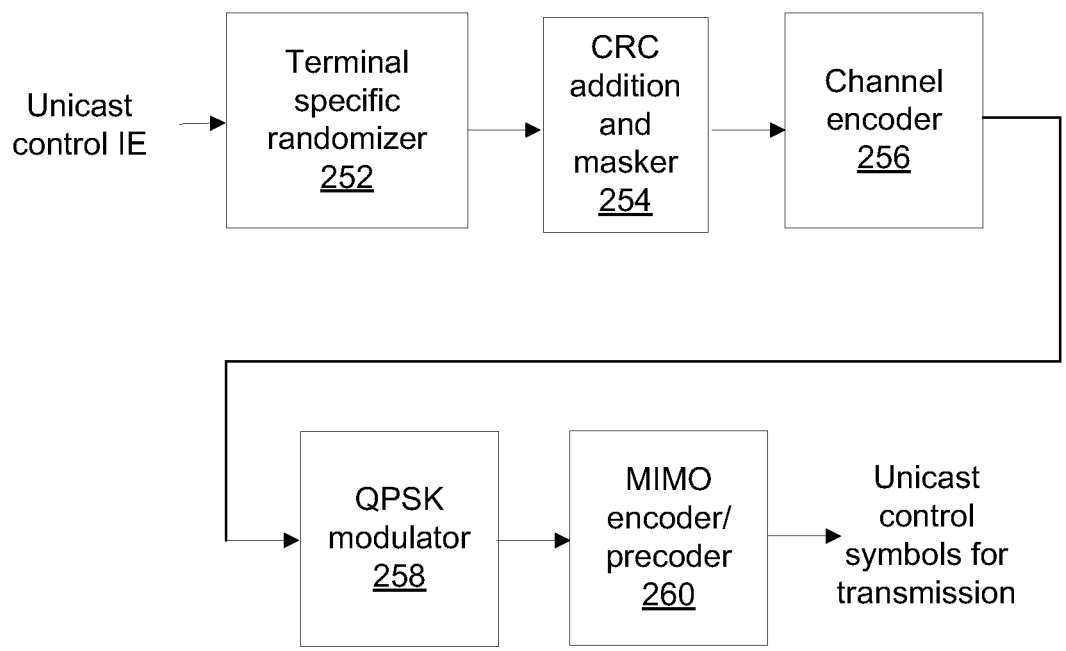
FIG. 2 depicts an example process that can be used by a base station to protect an information element prior to transmission to a user element.

FIG. 2 depicts an example process that can be used by a base station to protect an information element prior to transmission to a user element. Terminal specific randomizer 252 is to scramble the unicast control information element (IE) with a random sequence whose seed is a number different from the user ID. Control information can include information to schedule transmissions between the base station and mobile station as well as information used to decode communications between the base station and mobile station. When the base station is compatible with IEEE 802.16m draft 8, some or all IEs specified in section 16.3.5.5.2.4 can be randomized, including multicast and broadcast IEs. In some cases, each IE can be randomized separately because each IE is intended for a different terminal. However, groups of IE may in some cases be randomized together when intended for the same terminal. The seed can be 15 bits in length, although other numbers of bits can be used. The seed can be chosen using any method such as a random number or using an equation with a user ID as the input as long as different UEs and mobile stations have different seeds. For example, IEs can be randomized using a random sequence generation and randomization process described in section 16.3.10.1.3 of IEEE 802.16m draft 8. A pseudorandom binary sequence (PRBS) generator can be used where the seed is the initial vector.

When a 3GPP LTE network is used, terminal specific randomizer 252 is to randomize some or all DCI formats. Each DCI format can be randomized separately or groups of DCI formats may in some cases be randomized together when intended for the same terminal. As used herein, IE may be refer to DCI format and vice versa.

The base station can transmit the seed to a UE or MS (not depicted) using a unicast MAC management message. For example, the seed can be transmitted to the UE or MS using a field added to an AAI-REG-RSP message. The AAI-REG-RSP message is specified in IEEE 802.16m draft 8 (2010) at section 16.2.3.9. The mobile station could use the seed to descramble the control channel IE with a random sequence of this seed before further parsing of the IE. If the network is compatible with 3GPP LTE, a MobilityControlInfo message described in 3GPP TS 36.331 (2010) can be used to transmit the seed to a UE.

CRC addition and masker 254 is to generate a CRC checksum for the randomized IE from terminal specific randomizer 252. In an embodiment, CRC addition and masker 254 is to generate a masked CRC checksum using techniques described in section 16.3.5.5.2.4 of IEEE 802.16m draft 8 (2010). For example, CRC addition and masker 254 is to generate a masked CRC checksum by performing an exclusive OR operation on the generated CRC checksum with a CRC mask to generate a masked CRC checksum. The CRC checksum can be generated according to standard CRC16-CCITT as defined in ITU-T recommendation X.25 as well as section 16.3.10.1.1 of IEEE 802.16m. The CRC mask can be the user ID (station ID) of the MS or UE that is to access the IE. To be more specific, for IEEE 802.16m compliant networks, the mask has 16 bits but the STID is only 12 bits with other bits appended in a manner shown in Table 843 of section 16.3.5.5.2.4 of IEEE 802.16m. CRC addition and masker 254 is to append the masked CRC checksum to the randomized IE from terminal specific randomizer 252 and provide the resulting data structure to the channel encoder 256.

The BS is to transmit the user ID (station ID) to the MS for CRC demasking using an AAI-REG-RSP or AAI-RNG-RSP message.

Channel encoder 256 is to perform channel encoding of the randomized IE and the masked CRC checksum to generate channel encoded data. The generated channel encoded data is provided to the Quadrature Phase Shift Keying (QPSK) modulator 258. The QPSK modulator 258 is to perform QPSK modulation of the channel encoded data to generate QPSK modulated data and provides the QPSK modulated data to the Multiple-Input and Multiple-Output (MIMO) encoder/precoder 260. The MIMO encoder/precoder 260 is to perform MIMO encoding/precoding of the QPSK modulated data to generate the symbols. The base station is to transmit symbols to the target mobile station via wireless communication links.

By contrast, section 16.3.5.3.2.4 of IEEE 802.16m draft 8 (2010) describes use of a seed for randomization that is the same as that used for the CRC mask. If an intruder determines a seed for the CRC mask, the seed can also be used to determine the randomization mask. Accordingly, additional protection of down link control information is not provided when the same seed is used for randomization and CRC mask. Various embodiments provide different seed values for randomization and CRC mask and thereby provide improved protection of control information. With the seed value to initialize the IE scrambling sequence and the user ID (which is different from the seed value) masking the CRC, the security of the control channel is greatly improved. For example, suppose both the seed value and user ID are 15-bit sequences. With the user ID only, an intruder has to try $2^{15}$, or 32768 possible user IDs. With the new seed value, an intruder would have to try 2^30 or roughly 1billion sequences to access the control channel. This greatly improves the protection of the unicast control channels.

Figure 3:
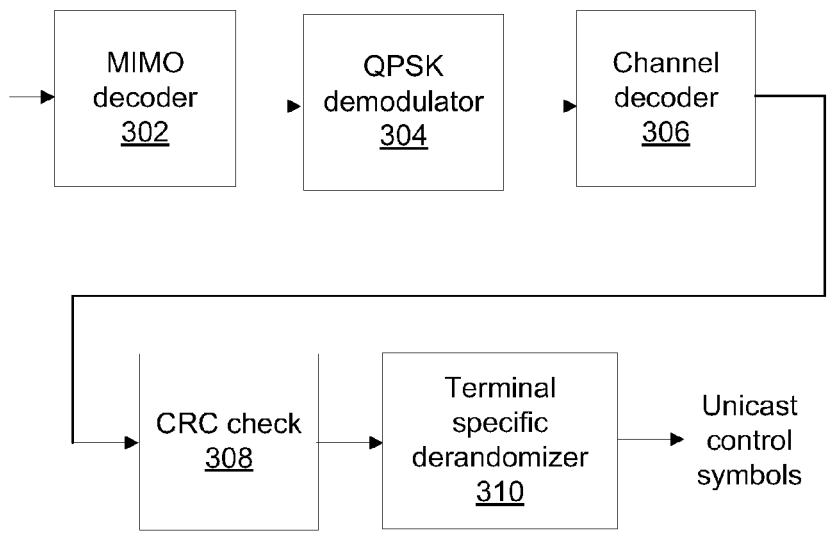
FIG. 3 depicts an example of processing scheme to retrieve control channel information.

FIG. 3 depicts an example of processing scheme to retrieve control channel information. The scheme can be used by a mobile station or user element to retrieve downlink unicast control symbols. MIMO decoder 302 is to perform MIMO decoding of symbols. QPSK demodulator 304 is to perform QPSK demodulation of QPSK modulated data. Channel decoder 306 is to perform channel decoding of the randomized IE and the masked CRC checksum to generate channel decoded data. CRC check block 308 is to use the user ID of the MS to unmask the CRC checksum. CRC check block 308 is also to compare the unmasked CRC checksum to a reference CRC value. In the event of a match between the unmasked CRC checksum and the reference CRC value, terminal specific de-randomizer 310 is to use a seed value to generate a random sequence and use it de-randomize one or more IEs using an inverse randomizer scheme as that of terminal specific randomizer 252. The seed value can be a value transmitted by a base station and that is different from the user ID.

Figure 4:
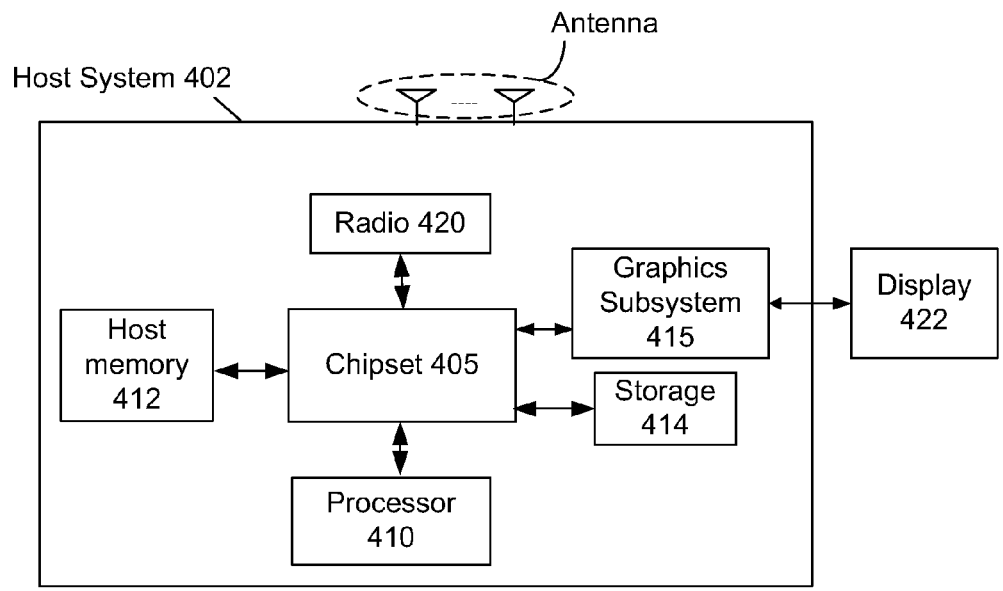
FIG. 4 depicts an example system that can use embodiments of the present invention.

FIG. 4 depicts an example system that can use embodiments of the present invention. Computer system 400 may include host system 402 and display 422. Computer system 400 can be implemented in a handheld personal computer, mobile telephone, set top box, or any computing device. Host system 402 may include chipset 405, processor 410, host memory 412, storage 414, graphics subsystem 415, and radio 420. Chipset 405 may provide intercommunication among processor 410, host memory 412, storage 414, graphics subsystem 415, and radio 420. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit. In various embodiments, processor 410 or radio 420 can be configured to perform techniques described herein to protect or access information elements.

Host memory 412 may be implemented as a volatile memory device such as but not limited to a Random Access Memory (RAM), Dynamic Random Access Memory (DRAM), or Static RAM (SRAM). Storage 414 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 415 may perform processing of images such as still or video for display. An analog or digital interface may be used to communicatively couple graphics subsystem 415 and display 422. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

Radio 420 may include one or more radios capable of transmitting and receiving signals in accordance with applicable wireless standards such as but not limited to any version of IEEE 802.11, IEEE 802.16, and 3GPP LTE. For example, radio 420 may include at least a physical layer interface and media access controller.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method, performed at a base station, the method comprising:
at a first stage,
determining a seed value for encoding at least one information element;
encoding the at least one information element based on the seed value, wherein said encoding includes scrambling the at least one information element with a random sequence using the seed value, the seed value being a number different from a station identifier of target device to receive the information element;
at a second stage,
applying cyclical redundancy check (CRC) masking to the scrambled at least one information element using the station identifier of the target device; and
transmitting the seed value in a message to the target device.

2. The method of claim 1, wherein the message comprises an Advanced Air Interface Registration Response (AAI-REG-RSP) message.

3. The method of claim 1, wherein encoding of at least one information element comprises using a Pseudo Random Binary Sequence generator with the seed value as an input vector.

4. The method of claim 1, wherein encoding of at least one information element comprises using a Pseudo Random Binary Sequence generator for an individual information element intended for access by a particular mobile station with the seed value as an input vector.

5. The method of claim 1, wherein encoding of at least one information element comprises using a Pseudo Random Binary Sequence generator for a group of one or more information elements intended for access by a particular mobile station with the seed value as an input vector.

6. The method of claim 1, further comprising:
channel encoding the first data structure;
applying Quadrature Phase Shift Keying (QPSK) modulation on the channel encoded first data structure; and
Multiple-Input and Multiple-Output (MIMO) encoding on the QPSK modulated and channel encoded first data structure.

7. A mobile station comprising:
a display device;
at least one antenna;
a radio; and
a processor configured to:
at a first stage,
decode a cyclic redundancy check (CRC) checksum value using a station identifier of the mobile station;
at a second stage,
recognize a seed value used for decoding of at least one information element, wherein the seed value is different from the station identifier; and
descramble the at least one information element based on the seed value.

8. The mobile station of claim 7, wherein the seed value is transmitted in an Advanced Air Interface Registration Response (AAI-REG-RSP) message.

9. The mobile station of claim 7, wherein decoding of the at least one information element comprises using an inverse Pseudo Random Binary Sequence generator with the seed value as an input vector.

10. The mobile station of claim 7, wherein the processor is also to:
apply Multiple-Input and Multiple-Output (MIMO) decoding on a received data structure;
apply Quadrature Phase Shift Keying (QPSK) demodulation on the MIMO decoded data structure; and
apply channel decoding of the MIMO decoded and QPSK demodulated data structure.

11. A base station comprising:
at least one antenna;
a radio; and
a processor configured to:
at a first stage,
determine a seed value for encoding of at least one information element;
encode the at least one information element based on the seed value, wherein said encoding includes scrambling the at least one information element with a random sequence using the seed value, the seed value being different from a station identifier of a target device to receive the information element; and
at a second stage,
apply cyclical redundancy check (CRC) masking to the scrambled at least one information element using the station identifier of the target device; and
transmit the seed value in a message to the target device.

12. The base station of claim 11, The method of claim 1, wherein the message comprises an Advanced Air Interface Registration Response (AAI-REG-RSP) message.

13. The base station of claim 11, wherein encoding of at least one information element comprises using a Pseudo Random Binary Sequence generator for at least one information element intended for access by a particular mobile station with the seed value as an input vector.

14. The base station of claim 11, wherein the processor is also configured to:
apply channel encoding of the first data structure;
request apply Quadrature Phase Shift Keying (QPSK) modulation on the channel encoded first data structure; and
apply Multiple-Input and Multiple-Output (MIMO) encoding on the QPSK modulated and channel encoded first data structure.

* * * * *